United States Patent
Lee et al.

(10) Patent No.: US 7,842,112 B2
(45) Date of Patent: Nov. 30, 2010

(54) CYCLONE COLLECTOR

(75) Inventors: Sung Hwa Lee, Changwon-si (KR); Kie Tak Hyun, Changwon-si (KR); Young Bok Son, Changwon-si (KR); Hyoung Joo Cho, Changwon-si (KR); Kyeong Seon Jeong, Changwon-si (KR)

(73) Assignee: LG Electronics Inc., Seoul (KR)

( * ) Notice: Subject to any disclaimer, the term of this patent is extended or adjusted under 35 U.S.C. 154(b) by 601 days.

(21) Appl. No.: 11/664,511

(22) PCT Filed: May 24, 2005

(86) PCT No.: PCT/KR2005/001516

§ 371 (c)(1), (2), (4) Date: Jan. 22, 2008

(87) PCT Pub. No.: WO2006/038757

PCT Pub. Date: Apr. 13, 2006

(65) Prior Publication Data

US 2008/0134649 A1 Jun. 12, 2008

(30) Foreign Application Priority Data

Oct. 8, 2004 (KR) ............... 10-2004-0080442

(51) Int. Cl.
*B01D 45/00* (2006.01)

(52) U.S. Cl. .............. 55/343; 55/345; 55/346; 55/410; 55/413; 55/414; 55/418; 55/459.1; 55/DIG. 3; 55/434; 55/465

(58) Field of Classification Search ............ 55/337, 55/343, 345, 346, 410, 413, 414, 418, 459.1, 55/DIG. 3

See application file for complete search history.

(56) References Cited

U.S. PATENT DOCUMENTS

| 3,425,192 | A | | 2/1969 | Davis | |
|---|---|---|---|---|---|
| 3,925,044 | A | * | 12/1975 | Tu et al. | 55/337 |
| 5,156,500 | A | | 10/1992 | Pianegonda | 406/173 |
| 5,262,046 | A | * | 11/1993 | Forgac et al. | 208/161 |
| 2004/0103785 | A1 | | 6/2004 | North | 95/271 |
| 2005/0050678 | A1 | * | 3/2005 | Oh et al. | 15/353 |

FOREIGN PATENT DOCUMENTS

| EP | 0 885 585 | 12/1998 |
|---|---|---|
| FR | 2795345 | 12/2000 |

(Continued)

OTHER PUBLICATIONS

Decision on Grant dated Nov. 10, 2008.

(Continued)

*Primary Examiner*—Jason M Greene
*Assistant Examiner*—Dung Bui
(74) *Attorney, Agent, or Firm*—KED & Associates, LLP

(57) ABSTRACT

Cyclone collector including a primary cyclone (1) having a first inlet (14) for drawing external air, and a first outlet (14) for discharging air, a secondary cyclone (3) connected to the primary cyclone (1), and flow guide means (200) over the first outlet for preventing a flow direction of the air discharged from the first outlet (14) from turning sharply.

10 Claims, 3 Drawing Sheets

FOREIGN PATENT DOCUMENTS

| | | |
|---|---|---|
| GB | 2 360 719 | 10/2001 |
| GB | 2 406 067 | 3/2005 |
| RU | 1 476 689 | 3/1995 |
| RU | 2221648 | 1/2004 |
| SU | 86412 | 1/1961 |
| SU | 1655578 | 6/1991 |
| WO | WO 00/44272 | 8/2000 |
| WO | WO 01/14066 | 3/2001 |
| WO | WO01/60226 A | 8/2001 |
| WO | WO 02/067750 | 9/2002 |
| WO | WO2004/030508 | 4/2004 |

OTHER PUBLICATIONS

International Search Report dated Aug. 31, 2005.
Australian Office Action dated May 5, 2008.
Russian Office Action dated Jun. 16, 2008.
European Office Action issued in EP Application No. 05 746 092.5 dated Jun. 4, 2010.

* cited by examiner

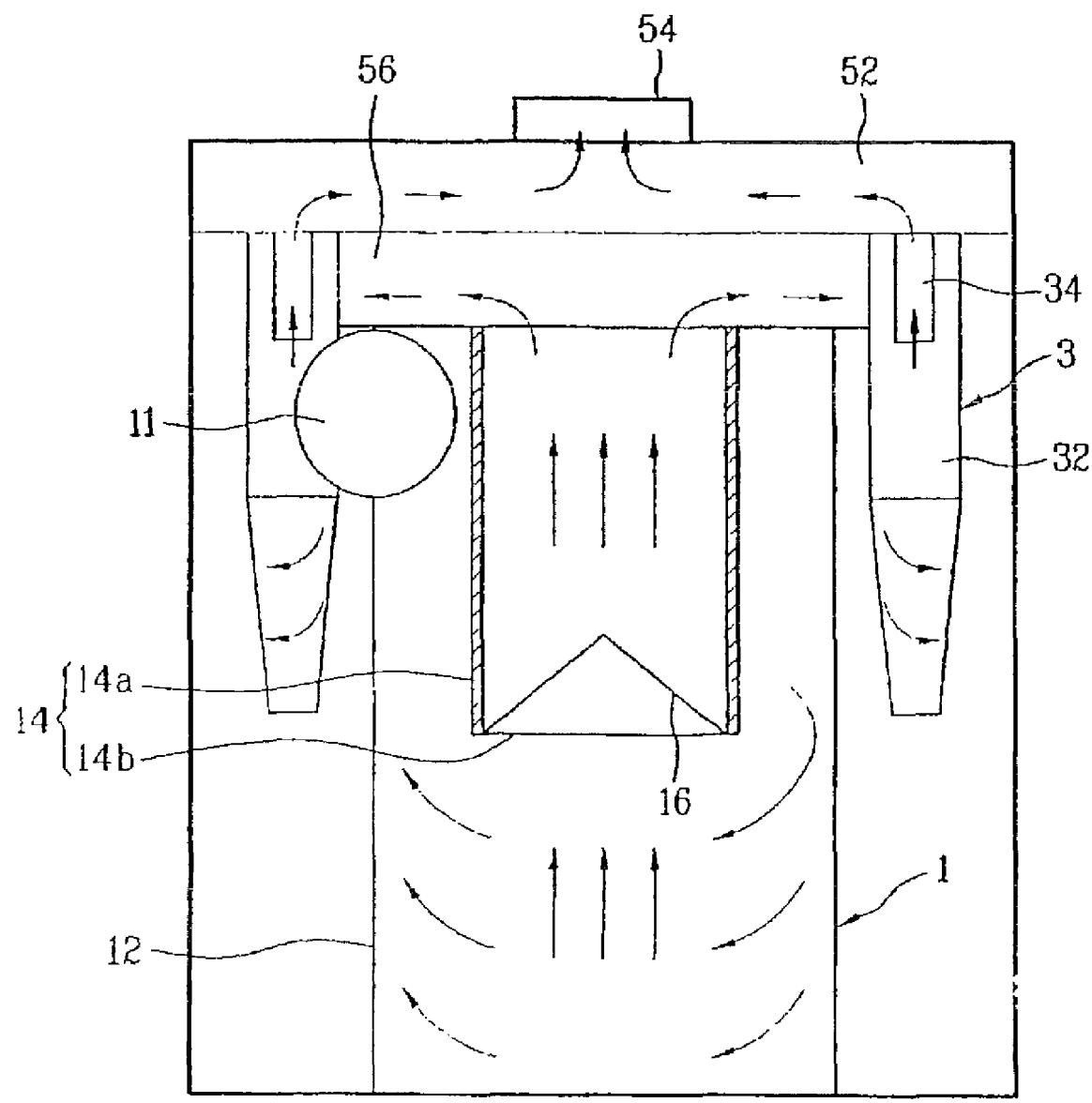
[Fig. 1]

[Fig. 2]
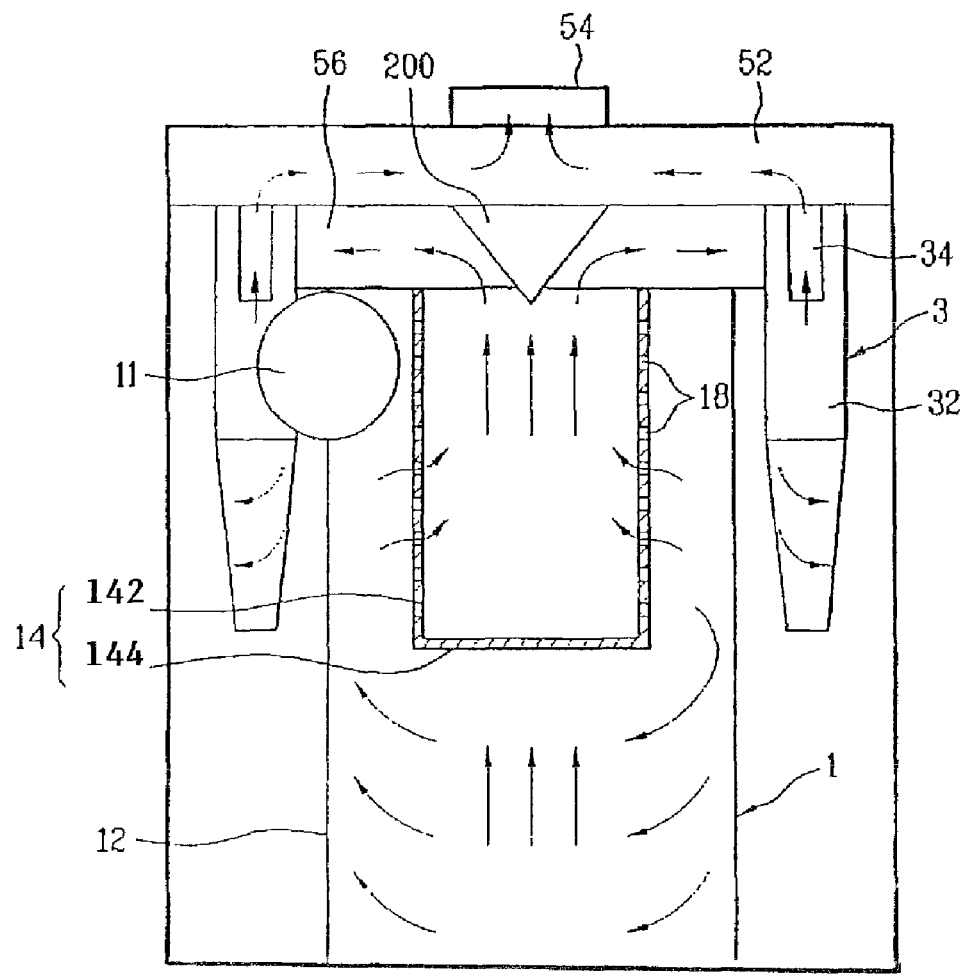
[Fig. 3]
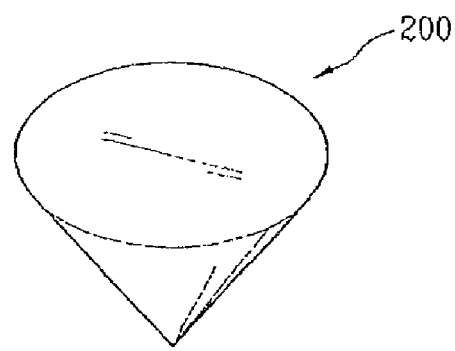

[Fig. 4]
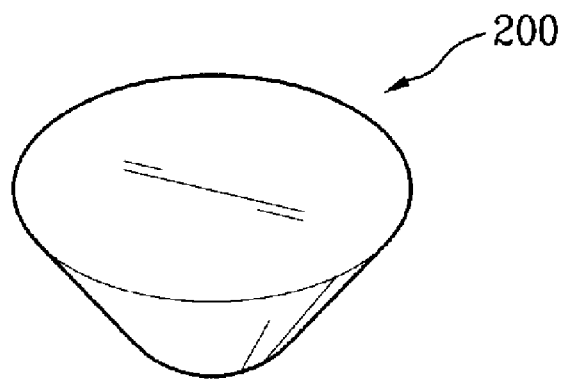
[Fig. 5]
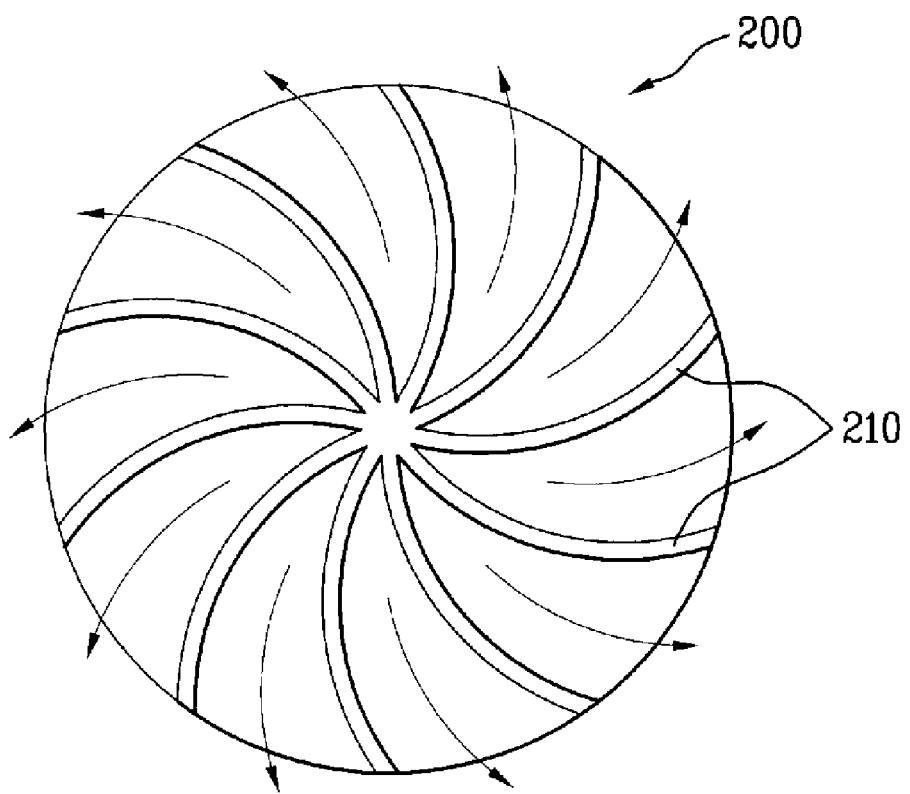

CYCLONE COLLECTOR

TECHNICAL FIELD

The present invention relates to cyclone collectors, and more particularly, to a dual cyclone collector having a plurality of cyclones connected to one another. Though application of the cyclone collector of the present invention is not limited to a vacuum cleaner, the cyclone collector of the present invention is particularly suitable to the vacuum cleaner.

BACKGROUND ART

The cyclone collector collects dust and dirt (hereafter called as dust, collectively) from air by using the principle of cyclone. The cyclone collector has wide applications, and applied to the vacuum cleaner as a domestic application.

Currently, in order to improve dust collecting performance, the dual cyclone collector having a plurality of cyclone collectors connected to one another is used. That is, the dual cyclone collector is provided with an upstream cyclone for drawing air containing dust and the like (hereafter called as "dirty air") and collecting comparatively large sized dust particles, and a downstream cyclone connected to the upstream cyclone for collecting relatively small sized dust particles. In general, the dual cyclone collector is provided with one upstream cyclone and one downstream cyclone. The downstream cyclone may have a plurality of small sized cyclones (hereafter called as "multi-cyclone collector"). An example of such a multi-cyclone collector is disclosed in Japanese utility model laid open publication No. S52-14775.

Referring to FIG. 1, a related art multi-cyclone collector will be described.

The related art multi-cyclone collector is provided with a cyclone 1 (hereafter called as "primary cyclone") for drawing external dirty air, and collecting comparatively large sized dust particles, and a cyclone 3 (hereafter called as "secondary cyclone") connected to the primary cyclone 1 for collecting comparatively small sized dust particles. The secondary cyclone 3 in the multi-cyclone is a group of small sized cyclones.

This will be described in detail.

The secondary cyclone having a plurality of small sized cyclones is mounted on an outside circumference of the primary cyclone 1. The primary cyclone has a first inlet 11 in an upper portion of a first body 12 of the primary cyclone 1 for drawing the dirty air in a tangential direction, and a first outlet 14 at a substantially central portion of the primary cyclone 1 for discharging primarily filtered air (hereafter called as "partially dirty air") to the secondary cyclone 3. In general, the first outlet 14 has a cylindrical body 14a, with an opened bottom 14b and no holes in an upper portion thereof. In some cases, a filter 16 is mounted on the opened bottom 14b.

In the meantime, the secondary cyclone 3 has a plurality of small sized cyclones mounted on an outside circumference of the primary cyclone 1. Of course, each of the secondary cyclones 3 also has an inlet (not shown) and an outlet 34 (hereafter called as "a second inlet" and "a second outlet"). In general, between the primary cyclone 1 and the secondary cyclone 3, there is a buffering chamber 56 defined therein. Through the buffering chamber 56, air is introduced to the secondary cyclone 3 from the primary cyclone 1. Above the secondary cyclone 3, there is an outlet chamber 52 in communication with the second outlets 34 of the plurality of secondary cyclones 3, for discharging air dust collecting therefrom is completed (hereafter called as "clean air") through an outlet tube 54 via the outlet chamber 52.

The operation of the related art multi-cyclone collector will be described.

Upon putting the multi-cyclone collector into operation, to drive suction force generating means, such as a suction fan (not shown) of the vacuum cleaner, the external dirty air is introduced into an inside of the primary cyclone 1 through the first inlet 11 of the primary cyclone 1. In this instance, the dirty air is drawn in a tangential direction, and swirls along an inside wall of the first body 12 of the primary cyclone 1, during which the dust is separated from the air by centrifugal force.

In this instance, comparatively heavy and large dust particles are collected on a bottom of the primary cyclone 1, and small dust particles not collected yet swirl the inside of the primary cyclone 1 until the small dust particles rise, and is discharged through the first outlet 14.

In the meantime, the partially dirty air discharged from the primary cyclone 1 is introduced into the secondary cyclone 3 through the second inlet (not shown). Eventually, the clean air having small sized dust particles separated therefrom at the secondary cyclone 3 once again is discharged to an outside of the collector through the second outlet 34, the outlet chamber 52, and the outlet tube 54.

DISCLOSURE OF INVENTION

Technical Problem

However, the related art multi-cyclone collector has the following problems.

The sharp turn of a flow direction of the air from the primary cyclone through the first outlet before entering into the secondary cyclone causes a pressure loss to impair dust collecting efficiency, and produces noise.

Technical Solution

Accordingly, the present invention is directed to a cyclone collector that substantially obviates one or more problems due to limitations and disadvantages of the related art.

An object of the present invention is to provide a cyclone collector which can improve dust collecting performance.

Another object of the present invention is to provide a cyclone collector which can reduce noise.

To achieve these objects and other advantages and in accordance with the purpose of the invention, as embodied and broadly described herein, a cyclone collector includes a primary cyclone having a first inlet for drawing external air, and a first outlet for discharging air, a secondary cyclone connected to the primary cyclone, and flow guide means over the first outlet for preventing a flow direction of the air discharged from the first outlet from turning sharply.

Preferably, the outlet includes a passage portion having a passage, and a closed portion under the passage portion, the closed portion being closed.

In the meantime, preferably, the flow guide means prevents the passage from turning sharply between the first outlet of the primary cyclone and the inlet to the secondary cyclone. For an example, the flow guide means guides the air in a perpendicular direction, substantially.

In the meantime, preferably, the flow guide means has an upper portion which becomes the larger as it goes the farther from the first outlet. For an example, the flow guide means is conical, or semispherical.

The flow guide means further includes a supplementary member extended downwardly for forming a passage. Preferably, the supplementary member has a predetermined curvature.

Advantageous Effects

Accordingly, the present invention permits to improve dust collecting efficiency, and suction power, and to reduce noise.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to exp lain the principle of the invention. In the drawings;

FIG. 1 illustrates a longitudinal section of a related art cyclone collector, schematically;

FIG. 2 illustrates a longitudinal section of a cyclone collector in accordance with a preferred embodiment of the present invention, schematically;

FIGS. 3 and 4 illustrate perspective views of the flow guide means in FIG. 2; and FIG. 5 illustrates a bottom view of a variation of the flow guide means in FIG. 2.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

A cyclone collector in accordance with a preferred embodiment of present invention will be described with reference to FIG. 2.

Referring to FIG. 2, alike the related art, the cyclone collector includes a primary cyclone 1, and a secondary cyclone 3 connected to the primary cyclone 1. However, in the present invention, a structure of the first inlet 14 of the primary cyclone 1 is different from the related art.

As described in the related art, until the present invention, in general it has been thought that the first inlet 14 of the first cyclone 1 is required to have an opened bottom, and no holes in an upper portion thereof. This is because, in order to collect dust by the cyclone principle, air is required to swirl downwardly along the inside wall of the body for separating the dust, and to move upward again substantially along a center axis for exit. According to this, it has been thought that the upper portion of the first inlet 14 is required to have no holes. However, surprisingly, the inventor's research shows that, even if the upper portion of the first outlet 14 has a passage, for an example, perforation 18, the dust collection can be made, effectively.

A structure of the first outlet 14 of the primary cyclone 1 of the present invention will be described in detail.

The first outlet 14 includes a passage portion 142 having a passage, and a closed portion 144 under the passage portion 142. Any shape of the passage portion 142 is viable as far as air can flow therethrough. For an example, the passage portion 142 may be a perforated portion having a plurality of holes 18. Shape of the hole 18 is not limited to a circle, but any shape of hole is viable. For an example, instead of the circular hole, a passage of a slot shape is also viable. For convenience sake, the passage portion 142 having the plurality of holes 18 will be described as an example of a perforated portion.

It is preferable that the perforated portion 142 is a downward extension from a top of, and substantially parallel to, a first body 12 of the primary cyclone 1. The perforated portion 142 has a bottom closed with the closed portion 144. Though a shape of the first outlet 14 is not limited, it is preferable that the shape of the first outlet 14 is cylindrical.

Meanwhile, in the present invention, there is flow guide means 200 mounted over the first outlet 14 for preventing the sharp turn of a flow direction of the air from the first outlet 14. That is, by the flow guide means, flow of the air from the first outlet 14 is guided smoothly.

The flow guide means 200 will be described in detail.

As described, the flow guide means 200 serves to make the air from the first outlet 14 to flow into the secondary cyclone 3 without turning sharply. Accordingly, the flow guide means 200 serves to form a passage without sharp turn between the first outlet 14 and the secondary cyclone 3, more specifically, an inlet to the secondary cyclone 3. Therefore, it is preferable that the flow guide means 200 is changed properly according to arrangement of the first outlet 14 of the primary cyclone and the inlet (not shown) to the secondary cyclone 3. As shown in FIG. 2, in a case the secondary cyclone 3 is arranged on an outside of the primary cyclone 1, i.e., the first outlet 14 of the primary cyclone 1 and the inlet to the secondary cycle 3 are arranged substantially perpendicular to each other, the flow guide means 200 is also has a shape to guide the air in a substantially perpendicular direction. For an example, as shown in FIGS. 3 and 4, the flow guide means 200 may have a shape which becomes the larger as it goes the farther from the first outlet 14. That is, it is preferable that the flow guide means 200 has a shape of a solid of revolution, such as a cone or a semisphere.

In the meantime, a supplementary member 210 may be formed on an underside of the flow guide means 200 additionally, which is extended downwardly to form a plurality of passages. It is preferable that the supplementary member 210 has a predetermined curvature, and it is more preferable that the curvature is formed in the flow direction.

The operation of the foregoing multi-cyclone collector will be described.

Upon putting the multi-cyclone collector into operation, external dirty air is drawn into the first body 12 through the first inlet 11 of the primary cyclone 1. In this instance, since the dirty air is drawn in a tangential direction of the first body 12, the dirty air has a certain swirling force, to separate comparatively heavy and large dust particles. The separated dust particles are collected on a bottom of the first body 12, while air containing fine dust particles not yet separated, i.e., partially dirt air, is discharged through the first outlet 14. The partially dirty air discharged from the first cyclone 1 to the second cyclone 3 through the first outlet 14 is drawn into a second body 32 through the second inlet (not shown), such that the fine dust particles are collected in the second body 32, and the clean air is discharged to an outside of the collector through the outlet tube 54 via the second outlet 34, and the outlet chamber 52.

The smooth guide of the air from the primary cyclone 1 to the secondary cyclone 3 through the first outlet by the flow guide means enables to reduce the pressure loss and noise.

In the meantime, though above embodiment illustrates, and describes a first outlet 1 of which bottom is closed, the present invention is not limited to this. That is, alike the related art, the present invention is applicable to a shape of the first outlet having a closed side and opened bottom.

Moreover, though above embodiment illustrates and describes a multi-cyclone collector having the secondary cyclone with a plurality of small sized cyclones, the present invention is not limited to this. That is, the present invention may also be applied to a general dual cyclone collector having two cyclone connected to each other, or to a single cyclone collector having only one cyclone.

Furthermore, the cyclone collector of the present invention is applicable to a canister type vacuum cleaner, or an upright type vacuum cleaner.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

As has been described, the cyclone collector of the present invention has the following advantages.

First, the prevention of sharp turn of a flow direction of the air from the primary cyclone permits to improve a dust collecting performance.

Second, the prevention of sharp turn of a flow direction of the air from the primary cyclone permits to reduce noise.

The invention of claimed is:

1. A cyclone collector comprising:
    a primary cyclone having an inlet passage that guides external air into the primary cyclone, and an outlet passage that guides air out of the primary cyclone;
    a secondary cyclone in airflow communication with the primary cyclone; and
    a flow guide positioned at an open terminal end of the outlet passage so as to guide air from the outlet passage of the primary cyclone to the secondary cyclone, the flow guide comprising:
        a body; and
        a plurality of guide ribs formed on an outer surface of the body so as to form a plurality of passages therebetween, wherein each of the plurality of guide ribs begins at a lowermost portion of the body and extends upward to an uppermost portion of the body, and wherein a distance between adjacent guide ribs changes such that the gap formed therebetween increases from the lowermost portion to the uppermost portion of the body.

2. The cyclone collector as claimed in claim 1, wherein the flow guide guides a gradual turning of air flowing from the outlet passage of the primary cyclone to an inlet of the secondary cyclone.

3. The cyclone collector as claimed in claim 1, wherein each of the plurality of ribs has a predetermined curvature.

4. The cyclone collector as claimed in claim 1, wherein the plurality of guide ribs are curved so as to turn the air gradually as it flows from the outlet passage of the primary cyclone to the secondary cyclone.

5. The cyclone collector as claimed in claim 1, wherein the outlet passage comprises:
    a substantially cylindrical outer wall that extends down into the primary cyclone;
    a closed bottom end; and
    an open top end in communication with a buffer chamber that provides for air flow communication between the primary and secondary cyclones.

6. The cyclone collector as claimed in claim 5, wherein the outer wall of the outlet passage includes a perforated portion having a plurality of holes extending therethrough.

7. The cyclone collector as claimed in claim 5, wherein the secondary cyclone comprises a plurality of secondary cyclones each in airflow communication with the primary cyclone via the buffer chamber.

8. The cyclone collector as claimed in claim 1, wherein a diameter of the flow guide increases gradually from the lowermost portion thereof, closest to the outlet passage of the primary cyclone, to the uppermost portion thereof.

9. The cyclone collector as claimed in claim 8, wherein the body of the flow guide is substantially conical.

10. The cyclone collector as claimed in claim 8, wherein the flow guide is semispherical.

* * * * *